US011882150B2

(12) United States Patent
Ghule et al.

(10) Patent No.: US 11,882,150 B2
(45) Date of Patent: *Jan. 23, 2024

(54) DYNAMIC SECURITY ACTIONS FOR NETWORK TUNNELS AGAINST SPOOFING

(71) Applicant: Juniper Networks, Inc., Sunnyvale, CA (US)

(72) Inventors: Ashish Suresh Ghule, Bangalore (IN); Jagadish Narasimha Grandhi, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,788

(22) Filed: Dec. 22, 2022

(65) Prior Publication Data

US 2023/0130595 A1 Apr. 27, 2023

Related U.S. Application Data

(63) Continuation of application No. 16/732,140, filed on Dec. 31, 2019, now Pat. No. 11,570,207.

(51) Int. Cl.
*H04L 9/40* (2022.01)
*H04L 47/32* (2022.01)
(Continued)

(52) U.S. Cl.
CPC .......... *H04L 63/1466* (2013.01); *H04L 47/32* (2013.01); *H04L 61/2592* (2013.01);
(Continued)

(58) Field of Classification Search
CPC ............. H04L 63/1466; H04L 63/1425; H04L 63/029; H04L 63/0236; H04L 47/32; H04L 61/2592; H04L 69/22; H04L 2101/686
See application file for complete search history.

(56) References Cited

U.S. PATENT DOCUMENTS 8,406,232 B2 3/2013 Alkhatib
2002/0166071 A1 11/2002 Lingafelt et al.
(Continued)

FOREIGN PATENT DOCUMENTS

CN 102948121 A 2/2013

OTHER PUBLICATIONS

Convery et al., "IPv6 and IPv4 Threat Comparison and Best-Practice Evaluation (v1.0)," Aug. 28, 2004, 43 pp.
(Continued)

*Primary Examiner* — Vance M Little
(74) *Attorney, Agent, or Firm* — Shumaker & Sieffert, P.A.

(57) ABSTRACT

An example network device receives an encapsulated network packet via a network tunnel; extracts IPv6 header information from the encapsulated network packet; extracts IPv4 header information from the encapsulated network packet; determines that the encapsulated network packet is a spoofed network packet based on the IPv6 header information and the IPv4 header information; and in response to detecting the spoofed network packet, transmits a message to a Tunnel Entry Point (TEP) device, the message including data representing the IPv6 header information and IPv4 header information. A tunnel entry point (TEP) device may receive the message and use the message to detect spoofed IPv6 traffic, e.g., when an IPv6 header and an IPv4 header of an encapsulated packet matches the IPv6 header and the IPv4 header specified in the message. In this manner, the TEP device may block, rate limit, or redirect spoofed network traffic.

16 Claims, 12 Drawing Sheets

(51) Int. Cl.
  *H04L 61/2592* (2022.01)
  *H04L 69/22* (2022.01)
  *H04L 12/46* (2006.01)
  *H04L 101/686* (2022.01)

(52) U.S. Cl.
  CPC ........ *H04L 63/029* (2013.01); *H04L 63/0236* (2013.01); *H04L 63/1425* (2013.01); *H04L 69/22* (2013.01); *H04L 12/4641* (2013.01); *H04L 2101/686* (2022.05)

(56) References Cited

U.S. PATENT DOCUMENTS

| | | |
|---|---|---|
| 2003/0187882 A1 | 10/2003 | Jinmei et al. |
| 2004/0236966 A1 | 11/2004 | D'Souza et al. |
| 2005/0160183 A1 | 7/2005 | Valli et al. |
| 2006/0092964 A1 | 5/2006 | Park et al. |
| 2006/0209885 A1 | 9/2006 | Hain et al. |
| 2007/0094725 A1 | 4/2007 | Borders |
| 2008/0071927 A1 | 3/2008 | Lee |
| 2008/0147837 A1 | 6/2008 | Klein et al. |
| 2009/0238080 A1 | 9/2009 | Hirano et al. |
| 2011/0090906 A1 | 4/2011 | Arkko |
| 2012/0011234 A1 | 1/2012 | Xu et al. |
| 2016/0014071 A1 | 1/2016 | Asati et al. |
| 2017/0012873 A1 | 1/2017 | Berg |
| 2019/0356591 A1 | 11/2019 | Ghule et al. |
| 2021/0203688 A1 | 7/2021 | Ghule et al. |

OTHER PUBLICATIONS

Extended Search Report from counterpart European Application No. 20204674.4, dated Nov. 30, 2020, 7 pp.

Ferguson et al., " Network Ingress Filtering: Defeating Denial of Service Attacks which employ IP Source Address Spoofing," Network Working Group: RFC 2827, May 2004, 20 pp.

First Office Action and Search Report, and translation thereof, from counterpart Chinese Application No. 202011183855.4 dated Nov. 3, 2022, 23 pp.

Marques et al., "Dissemination of Flow Specification Rules", RFC 5575, Aug. 2009, 22 pp., available at https://tools.ietf.org/html/rfc5575.

Prosecution History from U.S. Appl. No. 16/732, 140, dated Dec. 23, 2021 through Oct. 21, 2022, 78 pp.

Response to Extended Search Report dated Nov. 30, 2021, from counterpart European Application No. 20204674.4 filed Jan. 5, 2022, 28 pp.

Savola et al., "Security Considerations for 6to4," Network Working Group: RFC 3964, Dec. 2004, 41 pp.

Troan, Ed. et al., "Mapping of Address and Port with Encapsulation (MAP-E)", RFC 7597, Jul. 2015, 35 pp., available https://tools.ietf.org/html/rfc7597.

DYNAMIC SECURITY ACTIONS FOR NETWORK TUNNELS AGAINST SPOOFING

RELATED APPLICATION

This application is a Continuation of U.S. application Ser. No. 16/732,140, filed Dec. 31, 2019, which is incorporated herein by reference in its entirety.

TECHNICAL FIELD

The disclosure relates to computer networks and, more particularly, to prevention of attacks within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device using an Internet Protocol (IP) addresses and the Transmission Control Protocol (TCP). The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, which in turn may be geographically distributed over a wide area. Each site network may include one or more local area networks (LANs). With the advent of Virtual Private Network (VPN) technology, enterprises can now securely share data between site networks over a public network, such as the Internet. In a typical implementation, one or more "network tunnels" are engineered through the intermediate network to transport data and other network communications between the geographically distributed sites.

IP version 4 (IPv4) is an early version of IP that is still used today. IP version 6 (IPv6) is a newer version of IP that is also used today. Because some networks use IPv4 and other networks use IPv6, many computer networks encapsulate IPv4 packets into IPv6 packets, and vice versa, for transmission within networks that use IPv6 or IPv4, respectively. For example, two site networks may use IPv4 and a network tunnel for transporting data between the two site networks may use IPv6. As a result, network devices may use Mapping of Address and Port with Encapsulation (MAP-E) or other relay technologies to encapsulate IPv4 packets into IPv6 packets for transmission within the IPv6 network tunnel. Greater details regarding MAPE-E are discussed in O. Troan, Ed., et al., "Mapping of Address and Port with Encapsulation (MAP-E)", RFC 7597, July 2015, available at https://tools.ietf.org/html/rfc7597, the entire contents of which is incorporated by reference in its entirety.

Conventional Tunnel Entry Point (TEP) routers assume that any given upstream computing device can be "trusted" to only send valid encapsulated packets. However, this poses potential security vulnerability in that a TEP router may receive an encapsulated packet from a malicious source. That is, the malicious source may "spoof" an upstream computing device by encapsulating an invalid IPv4 packet into an IPv6 packet with valid IPv6 header information.

While a MAP-E Border Relay (BR) device of a receiving site network attempts to prevent spoofing by dropping the encapsulated packets in which the source address and port number from the IPv6 headers do not correlate to the source address and port number within the encapsulated IPv4 packet, at that point the encapsulated packet has already consumed network resources as it has already been transmitted through the tunnel network. This makes these networks susceptible Distributed Denial-of-Service (DDoS) attacks.

SUMMARY

In general, the disclosure describes techniques for triggering security actions for network tunnels against spoofing. In particular, techniques are described for extending Flow Specification (FlowSpec) to include outer header type and inner header type components of an encapsulated packet to match to trigger one or more security actions. For example, a network device (e.g., a router, Border Relay (BR) device) terminating a network tunnel to transmit an extended FlowSpec message to a tunnel entry point (TEP) device with an instruction (e.g., a packet flow specification) to drop, rate limit, or redirect future packets at the TEP device based on information regarding one or more spoofed packets detected at the network device. The FlowSpec message may be a Border Gateway Protocol (BGP) Network Layer Reachability Information (NLRI) message that includes IPv4 and IPv6 NLRI types for encapsulated packets. In some examples, the network device may maintain a respective counter for the number of detected spoofed packets per each CPE tunnel and may trigger the transmission of the FlowSpec message and/or other security actions in response to determining that a respective counter exceeds one or more thresholds. For example, the network device may log information regarding a spoofed packet at the network device if a minor threshold is exceeded, drop the spoofed packet at the network device if an intermediate threshold (higher than the minor threshold) is exceeded, and/or transmit the message to the TEP device if a major threshold (higher than the intermediate threshold) is exceeded.

In one example, a method includes receiving, at a network device, an encapsulated network packet via a network tunnel; extracting, by the network device, IPv6 header information from the encapsulated network packet; extracting, by the network device, IPv4 header information from the encapsulated network packet; determining, by the network device, that the encapsulated network packet is a spoofed network packet, including determining, by the network device, respective IPv6 header information from the IPv4 header information; comparing, by the network device, the extracted IPv6 header information with the determined, respective IPv6 header information; and determining, by the network device, that the extracted IPv6 header information does not match the determined, respective IPv6 header information; and in response to detecting the spoofed network packet, transmitting a message to a Tunnel Entry Point (TEP) device, the message including data representing the IPv6 header information and IPv4 header information.

In another examples, a method includes receiving, at a Tunnel Entry Point (TEP) device, a message including data representing IPv6 header information and IPv4 header information from a network device; receiving, at the TEP device, an encapsulated network packet; determining, by the TEP device, that the encapsulated network packet is a spoofed network packet, including matching the IPv6 header information to outer header information of the encapsulated packet; and matching the IPv4 header information to inner header information of the encapsulated packet; and in response to detecting the spoofed network packet, dropping, at the TEP device, the encapsulated network packet.

In another example, a computer-readable storage medium having stored thereon instructions that, when executed, cause a processor of a network device to receive an encapsulated network packet via a network tunnel; extract IPv6 header information from the encapsulated network packet; extract IPv4 header information from the encapsulated network packet; determine respective IPv4 header information from the IPv6 header information; compare the IPv4 header information and the respective IPv4 header information; determine that the encapsulated network packet is a spoofed network packet based on the IPv6 header information not matching the IPv4 header information; and in response to detecting the spoofed network packet, transmit a message to a Tunnel Entry Point (TEP) device, the message including data representing the IPv6 header information and IPv4 header information.

The details of one or more examples are set forth in the accompanying drawings and the description below. Other features, objects, and advantages will be apparent from the description and drawings, and from the claims.

DETAILED DESCRIPTION

Figure 1:
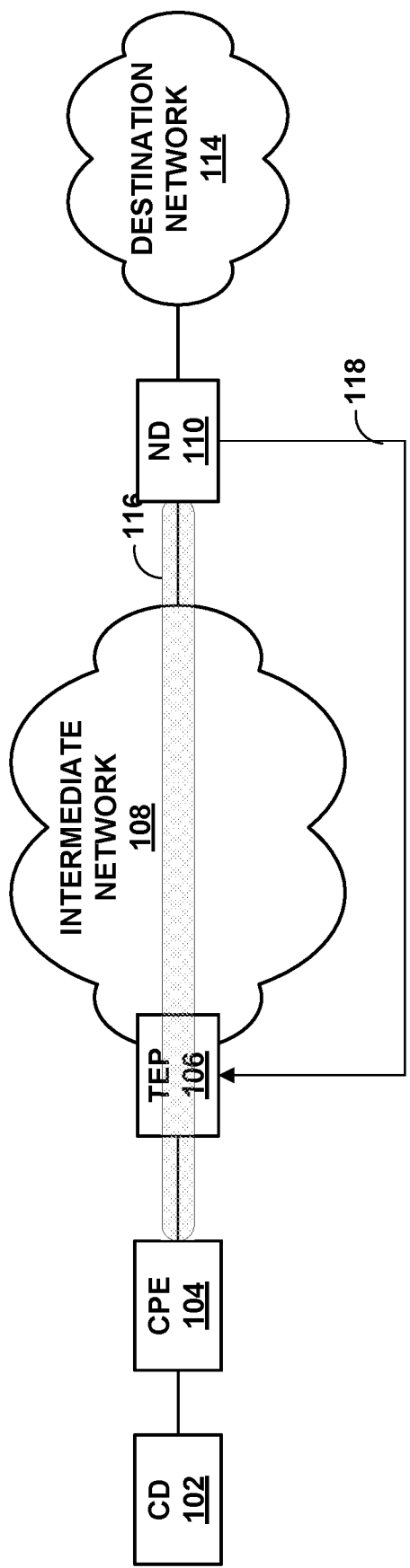
FIG. 1 is a block diagram illustrating an example system including a Border Relay (BR) device that detects spoofed packets and performs security actions in accordance to techniques of this disclosure.

FIG. 1 is a block diagram illustrating an example system including network device (ND) 110 that detects spoofed packets and performs security actions in accordance to techniques of this disclosure. In general, a customer device (CD) 102 may transmit packet flows via intermediate network 108 to a destination device (not shown) within destination network 114. For purposes of explanation, it is assumed that destination network 114 includes router(s) or switch(es) that direct packet traffic to the destination device. In some examples, customer device 102 may be part of a source network (not shown). The source network and destination network 114 may use IP version 4 (IPv4) and intermediate network 108 may use IP version 6 (IPv6). To transmit packet flows destination network 108, customer premise equipment (CPE) 104 (or source network) may encapsulate IPv4 packets into IPv6 packets (and vice versa) for transmission through intermediate network 108 via network tunnel 116. In some examples, CPE 104 may also be configured to decapsulation IPv4 packets from IPv6 encapsulated packets (and vice versa).

For example, client device 102 may be coupled (e.g., via a data link) to CPE 104 which may be configured to function as a customer edge router in a use Mapping of Address and Port with Encapsulation (MAP-E) deployment. In some examples, CPE 104 may receive one or more IPv4 packets from CD 102 and encapsulate those one or more IPv4 packets into one or more IPv6 packets based on the IPv4 packet header information (e.g., using MAP-E). For example, CPE 104 may determine an IPv6 source address based on the IPv4 source address and IPv4 source port number from the IPv4 header information (e.g., using Network Address and Port Translation (NAPT) or other address mapping techniques). Similarly, CPE 104 may determine an IPv6 destination address based on the IPv4 destination address and, optionally, destination port number from the IPv4 header information. The one or more encapsulated packets are transmitted (e.g., via a datalink) to tunnel entry point (TEP) device 106, which forwards the one or more encapsulated packets through network tunnel 116 to network device 110 based on the IPv6 header information of the one or more encapsulated packets. Further example details regarding MAPE-E can be found in in O. Troan, Ed., et al., "Mapping of Address and Port with Encapsulation (MAP-E)", RFC 7597, July 2015, available at https://tools.ietf.org/html/rfc7597, the entire contents of which is incorporated by reference in its entirety. Although the techniques for transporting IPv4 packets through intermediate network 108 are described herein as using MAP-E, such techniques may user other relay technologies, such as, for example, 6over4, 6to4, the Intra-Site Automatic Tunnel Addressing Protocol (ISATAP), or IPv6 Rapid Deployment on IPv4 Infrastructures (6rd).

In some examples, network device 110 comprises a router that terminates network tunnel 116 and connects intermediate network 108 to destination network 114. In some examples, all encapsulated packet traffic from CPE 104 (or from other CPEs that transmit packet traffic through intermediate network 108) is forwarded to network device 110 in a hub-and-spoke configuration. In some examples, network device 110 comprises a CPE for destination network 114 in a "mesh" mode configuration. Either way, network device 110 decapsulates IPv4 packets from the received encapsulated packets and forwards the IPv4 packets to destination network 114 based on the IPv4 header information.

In some examples, network device 110 may perform packet validation on received encapsulated packets to help prevent spoofing. For example, network device 110 may extract IPv6 header information and IPv4 header information from the encapsulated packet and compare that header information to determine whether the encapsulated packet is valid. In some examples, network device 110 may determine a respective IPv6 source address from the IPv4 source address and the IPv4 source port of the IPv4 header information and compare the respective IPv6 source address to the IPv6 source address from the IPv6 header information of the encapsulated packet, and determine whether the respective IPv6 source address matches (e.g., correlates) to the IPv6 source address of the encapsulated packet. In other examples, network device 110 may extract a respective IPv4 source address and a respective IPv4 source port number from the IPv6 source address of IPv6 header information of the encapsulated packet, and determine whether the respective IPv4 source address and respective IPv4 source port number correlate to the IPv4 source address and the IPv4 source port number of the IPv4 header information of the encapsulated packet. Either way, network device 110 will determine whether the IPv6 header information matches (e.g., correlates) to the IPv4 header information of the encapsulated packet. If the IPv6 header information matches (e.g., correlates) to the IPv4 header information of the encapsulated packet, the encapsulated packet is valid and network device 110 may forward the encapsulated packet to destination network 114.

If the IPv6 header information does not correlate to the IPv4 header information of the encapsulated packet, the encapsulated packet is an invalid spoofed packet because it originated from an unknown source (e.g., other than CD 102 or CPE 104) and network device 110 may perform one or more security actions. In some examples, network device 110 may eschew forwarding the IPv4 packet to destination network 114 and drop the encapsulated packet. In some examples, network device 110 may rate limit or redirect the encapsulated packet. In some examples, network device 110 may transmit, via a peering session (e.g., using external Border Gateway Protocol (eBGP), internal BGP (iBGP), multiprotocol BGP (MP-BGP), or any other border gateway protocol), a message 118 to TEP device 106 with an instruction to drop, rate limit, or redirect future packets at TEP device 106 based on IPv4 packet header information and IPv6 packet header information extracted from the spoofed encapsulated packet. In some examples, network device 110 may transmit (e.g., broadcast) the same message 118 to other TEP devices via other peering sessions. In this way, network device 110 may help prevent a Distributed Denial-of-Service (DDoS).

In some examples, message 118 may comprise Border Gateway Protocol (BGP) Network Layer Reachability Information (NLRI) message. For example, message 118 may extend a Flow Specification (FlowSpec) to include outer (e.g., IPv6) header type and inner (e.g., IPv4) header type components of an encapsulated packet to match. In particular, message 118 may include one or more outer header type components, such as source IPv6 address or destination IPv6 address, and one or more inner header type components, such as an IPv4 protocol, a source IPv4 address, a source IPv4 port number, a destination IPv4 address, or a destination IPv4 port number. In some examples, message 118 may comprise Access Control List (ACL) actions or rules for filtering spoofed encapsulated packets based on outer and inner header information. Either way, message 118 may define the combination of IPv6 header and/or IPv4 header values for encapsulated packets to drop, rate limit, or redirected at TEP device 106. In this way, spoofed packets will not unnecessarily consume network resources at intermediate network 108.

In some examples, network device 110 may maintain a respective spoofed packet counter for each CD, CEP, TEP, and/or network tunnel and increment the respective spoofed packet counter each time a spoofed packet allegedly from that CD, CEP, TEP, or network tunnel is detected at network device 110. For example, network device 110 may maintain a first spoofed packet counter for CEP 104 and network device 110 may increment that first spoofed packet counter for every spoofed encapsulated packet it detects that allegedly came from CEP 104. In some examples, the one or more security actions performed by network device 110 may depend on the value of the respective spoofed packet counter. For example, network device 110 may log information regarding a spoofed packet at network device 110 if a minor threshold is exceeded, drop the spoofed packet at the network device 110 if an intermediate threshold (higher than the minor threshold) is exceeded, and/or transmit message 118 to TEP device 106 (and, optionally, other peer TEP devices) if a major threshold (higher than the intermediate threshold) is exceeded. In this way, network device 110 may help prevent Denial-of-Service (DoS) attacks or DDoS attacks at TEP 106, before network resource are consumed at intermediate network 108 and/or network tunnel 116.

Figure 2:
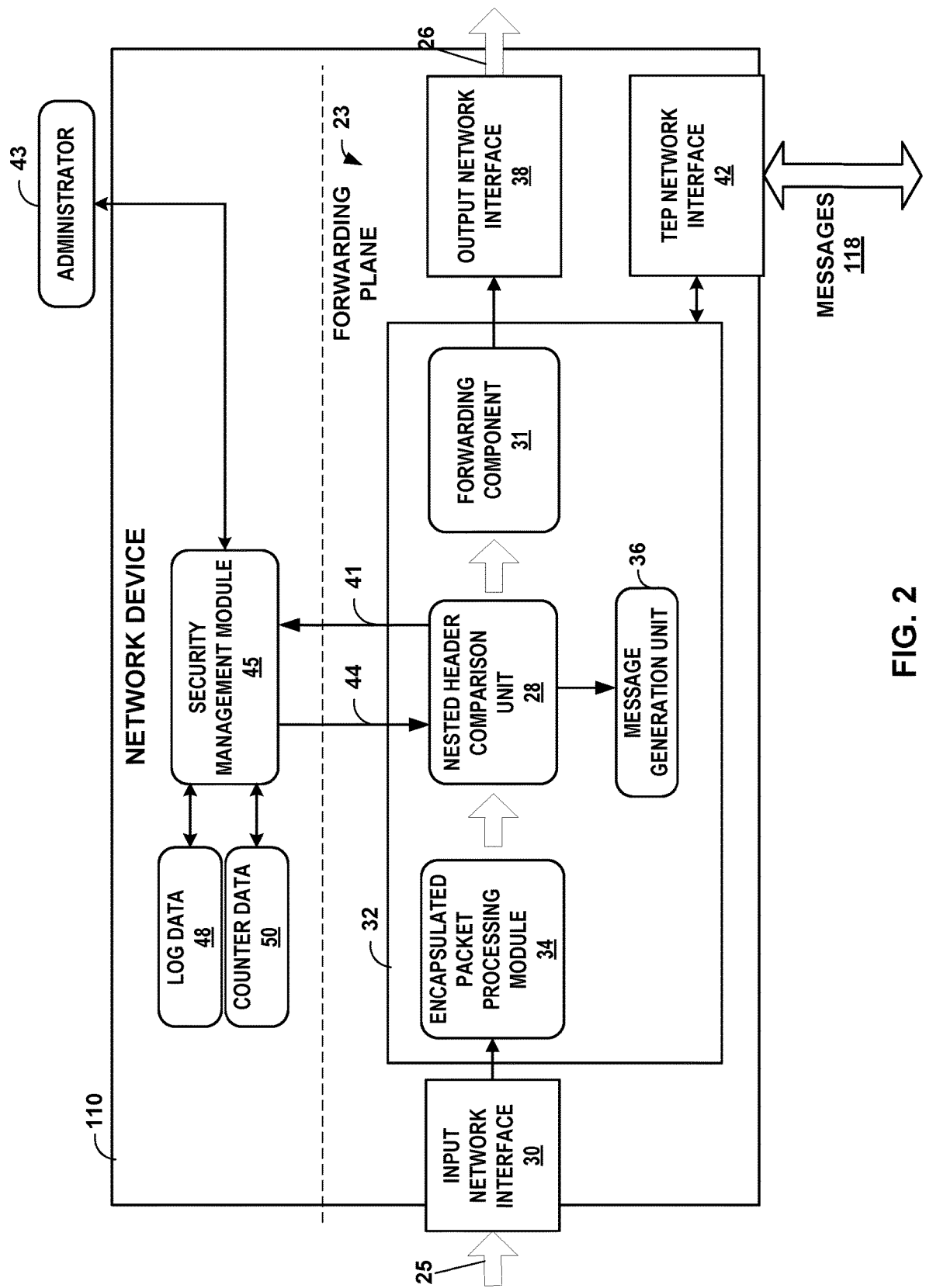
FIG. 2 is a block diagram illustrating an example arrangement of components of a network device in accordance to techniques of this disclosure.

FIG. 2 is a block diagram illustrating an example arrangement of components of a network device 110 in accordance to techniques of this disclosure. FIG. 2 is a block diagram illustrating an example arrangement of components of network device 110 (FIG. 1). In the example of FIG. 2, network device 110 comprises input network interface 30, control unit 32, encapsulated packet processing module 34, nested header comparison unit 28, message generation unit 36, forwarding component 31, output network interface 38, TEP network device interface 42, and security management module 45. Although three distinct network interfaces are depicted in the example of FIG. 2, other examples may include a single network interface that performs the functions attributed to input network interface 30, output network interface 38, and/or TEP network device interface 42.

Security management module 45 presents a user interface by which administrator 43 configures network device 110. For example, administrator 43 may configure network device 110 to monitor particular subnets of the enterprise network. In addition, security management module 45 presents a user interface by which administrator 43 may specify attack definitions 44, which security management module 45 relays to nested header comparison unit 28. In one example, attack definitions 44 comprise compound attack definitions. In some examples, attack definitions 44 may be determined from administrator 43 reviewing log data 48 (e.g. including IPv6 header information and/or IPv4 header information corresponding to spoofed encapsulated packets received at network device 110) via another user interface presented by security management module 45. Moreover, security management module 45 may present a user interface by which administrator 43 may modify assumptions regarding packet flow characteristics, such as the highest priority packet flows for monitoring, port bindings for applications, or other features of determining a type of application and protocol associated with the packet flow.

In the illustrated example, network device 110 includes a forwarding plane 23 that transparently monitors inbound network traffic 25 (e.g., encapsulated IPv6 packets) and forwards the network traffic as outbound network traffic 26 (e.g., IPv4 packets). In the example illustrated by FIG. 2, forwarding plane 23 includes input network interface 30, encapsulated packet processing module 34, nested header comparison unit 28, a plurality of message generation unit 36, forwarding component 31, output network interface 38, and TEP network device interface 42.

Network device 110 comprises control unit 32 that executes encapsulated packet processing module 34, nested header comparison unit 28, message generation unit 36, and forwarding component 31. Control unit 32 may comprise any combination of hardware, firmware, and/or software for performing the functions attributed to control unit 32. For example, control unit 32 may comprise a programmable processor that executes instructions stored in a computer-readable storage medium. Network device 110 may comprise a computer-readable storage medium encoded with instructions for encapsulated packet processing module 34, nested header comparison unit 28, message generation unit 36, and/or forwarding component 31. Alternatively, encapsulated packet processing module 34, nested header comparison unit 28, message generation unit 36, and/or forwarding component 31 may comprise discrete hardware units, such as digital signal processors (DSPs), application specific integrated circuits (ASICs), field programmable gate arrays (FPGAs), or any other equivalent integrated or discrete logic circuitry, or any combination of hardware, firmware, and/or software.

In general, encapsulated packet processing module 34 decapsulates IPv4 packets from received encapsulated IPv6 packets. In particular, encapsulated packet processing module 34 extracts the outer IPv6 header information, the inner IPv4 header information, and the IPv4 packet from the encapsulated packet (e.g., using MAP-E) received at input network interface 30. The outer IPv6 header information may include IPv6 source address or IPv6 destination address. The IPv4 header information may include the five-tuple (e.g., source IPv4 address, destination IPv4 address, source IPv4 port, destination IPv4 port, IPv4 protocol).

Nested header comparison unit 28 inspects nested packet header information to identify spoofed encapsulated packets. In some examples, nested header comparison unit 28 may determine whether the extracted outer IPv6 header matches (e.g., correlates) to the inner IPv4 header information. For example, nested header comparison unit 28 may determine a respective IPv6 source address from the IPv4 source address and the IPv4 source port of the IPv4 header information and compare the respective IPv6 source address to the IPv6 source address from the IPv6 header information of the encapsulated packet, and determine whether the respective IPv6 source address matches (e.g., correlates) to the IPv6 source address of the encapsulated packet. In other examples, nested header comparison unit 28 may derive (or extract) a respective IPv4 source address and a respective IPv4 source port number from the IPv6 source address of IPv6 header information of the encapsulated packet, and determine whether the respective IPv4 source address and respective IPv4 source port number derived from the IPv6 header information correlate to the IPv4 source address and the IPv4 source port number from the inner IPv4 header information of the encapsulated packet. If the IPv6 header information does not correlate to the IPv4 header information of the encapsulated packet, the encapsulated packet is an invalid spoofed packet because it originated from an unknown source. In some examples, nested header comparison unit 28 and/or security management module 45 maintains one or more spoofed packet counters in counter data 50 that they increment every time a spoofed packet is detected by nested header comparison unit 28. In some examples, security management module 45 detects a DoS or DDoS attack if a spoofed packet counter in counter data 50 exceeds a particular threshold (e.g., as described above with reference to FIG. 1). When nested header comparison unit 28 detects a spoofed packet, nested header comparison unit 28 may execute a programmed response (e.g., a security action), such as sending alert 41 to security management module 45 or instructing forwarding component 31 to drop, rate limit, or redirect packets of the packet flow. Nested header comparison unit 28 may also rate-limit the packet flow, i.e., throttle network sessions corresponding to detected spoofed packet to a certain bitrate, such as 10 Mbits/second. In some examples, alert 41 may include outer IPv6 header information, inner IPv4 header information, or other information regarding the network session or spoofed packets. Security management module 45 may log information regarding the spoofed packet(s) in log data 48, increment one or more respective spoofed packet counters in counter data 50 based on alert 41, and/or trigger message generation unit 36.

Message generation unit 36 may construct a message 118 to send to other network devices, such as TEP devices or other upstream routers, to block or otherwise respond to packet flows from the source network device for which nested header comparison unit 28 detected a spoofed packet based on IPv4 packet header information and IPv6 packet header information extracted from a spoofed encapsulated packet (e.g., as described above with reference to FIG. 1). In some examples, message 118 may include data necessary for TEP device 106 to extract IPv4 header information/values from an encapsulated packet (e.g., as described below with reference to FIGS. 6A-8B and 10A-10C). In this way, spoofed packets may be dropped, rate limited, or redirected at a TEP (e.g., TEP 106) or other upstream routers to reduce the unnecessary consumption of network resources.

In the event a spoofed packet is detected, nested header comparison unit 28 outputs alert 41 to security management module 45 for logging and further analysis. In addition, nested header comparison unit 28 may take additional actions according to a policy definition, such as outputting message 118, dropping the packets associated with the communication session, rate limiting the communicating session, redirecting the packets, automatically closing the communication session or other action. If no spoofed packet is detected for a given communication session, forwarding component 31 continues to forward the packet flows between the peers. Forwarding component 31 may, for example, maintain a routing table that stores routes in accordance with a topology of the enterprise network for use in forwarding the packet flows.

In some examples, nested header comparison unit 28 and/or security management module 45 of network device 110 may maintain a respective spoofed packet counter in counter data 50 for a CD, CEP, TEP, and/or network tunnel and increment the respective spoofed packet counter each time nested comparison unit 28 detects a spoofed packet. For example, security management module 45 may maintain a first spoofed packet counter for CEP 104 and security management module 45 may increment that first spoofed packet counter for every spoofed encapsulated packet nested comparison unit 28 detects that allegedly came from CEP 104 (e.g., in response to receiving alert 41). In some examples, the one or more security actions or programmed response performed by network device 110 may depend on the value of the respective spoofed packet counter. For example, network device 110 may log information regarding a spoofed packet at network device 110 if a minor threshold is exceeded, instruct forwarding component 31 to drop the spoofed packet if an intermediate threshold (higher than the minor threshold) is exceeded, and/or trigger message generation unit 36 to generate and transmit message 118 to TEP device 106 (and, optionally, other peer TEP devices) if a major threshold (higher than the intermediate threshold) is exceeded. In this way, network device 110 may help prevent Denial-of-Service (DoS) attacks or Distributed Denial-of-Service (DDoS) attacks at TEP 106, before network resource are consumed at intermediate network 108 and/or network tunnel 116.

Figure 3A:
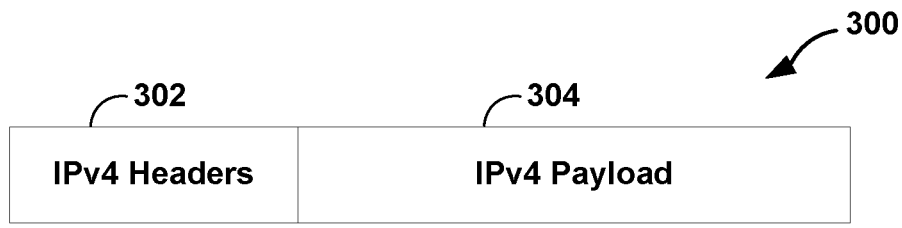
FIG. 3A is a block diagram illustrating a conceptual IPv4 packet in accordance to techniques of this disclosure.

FIG. 3A is a block diagram illustrating a conceptual IPv4 packet 300 in accordance to techniques of this disclosure. In this example, IPv4 packet 300 includes IPv4 headers 302 and IPv4 payload. IPv4 headers 302 may include IPv4 version (i.e., 4), protocol (e.g., Transmission Control Protocol (TCP), User Datagram Protocol (UDP), IPv6 encapsulation (ENCAP)), header checksum, 32-bit IPv4 source address, and 32-bit IPv4 destination address among others. IPv4 payload 304 includes the data to be transported by IPv4 packet 300. The contents of IPv4 payload 304 depend on the protocol being used. In some examples, IPv4 headers 302 or IPv4 payload may include a source port number and/or a destination port number, depending on the protocol being used.

Figure 3B:
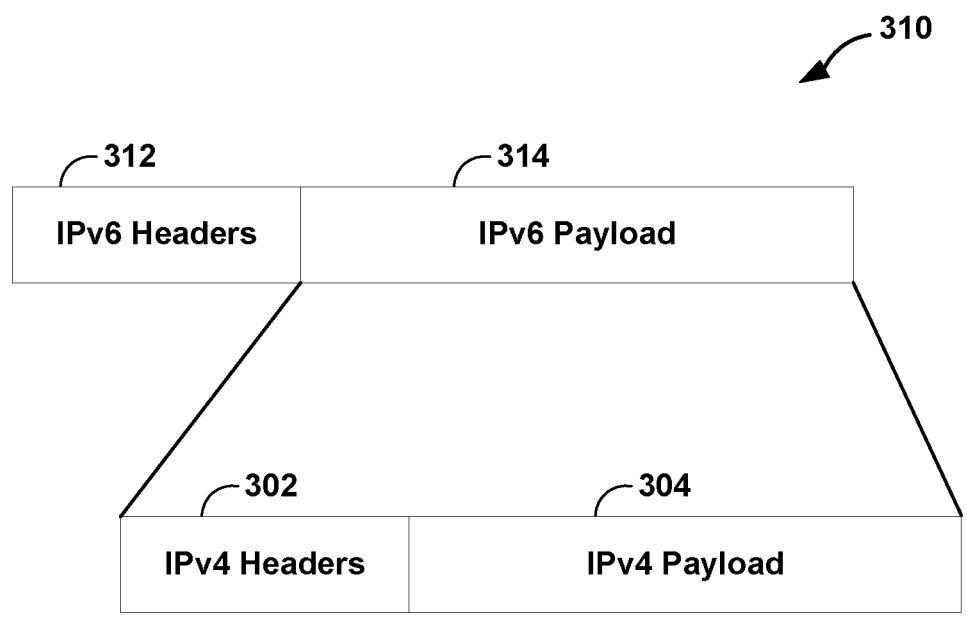
FIG. 3B is a block diagram illustrating a conceptual encapsulated IPv6 packet in accordance to techniques of this disclosure.

FIG. 3B is a block diagram illustrating a conceptual encapsulated IPv6 packet in accordance to techniques of this disclosure. In this example, IPv6 encapsulate packet 310 includes IPv6 headers 312 and IPv6 payload 314. IPv6 headers 312 may include IPv6 version (i.e., 6), 128-bit IPv6 source address, and 128-bit IPv6 destination address among others. IPv6 payload 314 includes the data to be transported by encapsulated IPv6 packet 310. In this example, the contents of encapsulated IPv6 payload is IPv4 packet 400 of FIG. 3A. The IPv6 source address in IPv6 headers 312 may be based on the 32-bit IPv4 source address and source port number from IPv4 headers 302 and/or IPv4 payload 304. Similarly, the IPv6 destination address in IPv6 headers 312 may be based on the 32-bit IPv4 destination address and destination port number from IPv4 headers 302 and/or IPv4 payload 304. In this way, the IPv6 source and destination addresses may be verified using the IPv4 source and destination addresses and port numbers. In some examples, IPv4 packet 300 may be encapsulated into IPv6 packet 310 using MAP-E or other relay technology (e.g., 6over4, 6to4, ISATAP, 6rd) While the techniques of this disclosure are described with IPv4 packets encapsulated inside of IPv6 packets, such techniques may be performed on IPv6 packets encapsulated inside of IPv4 packets.

Figure 4:
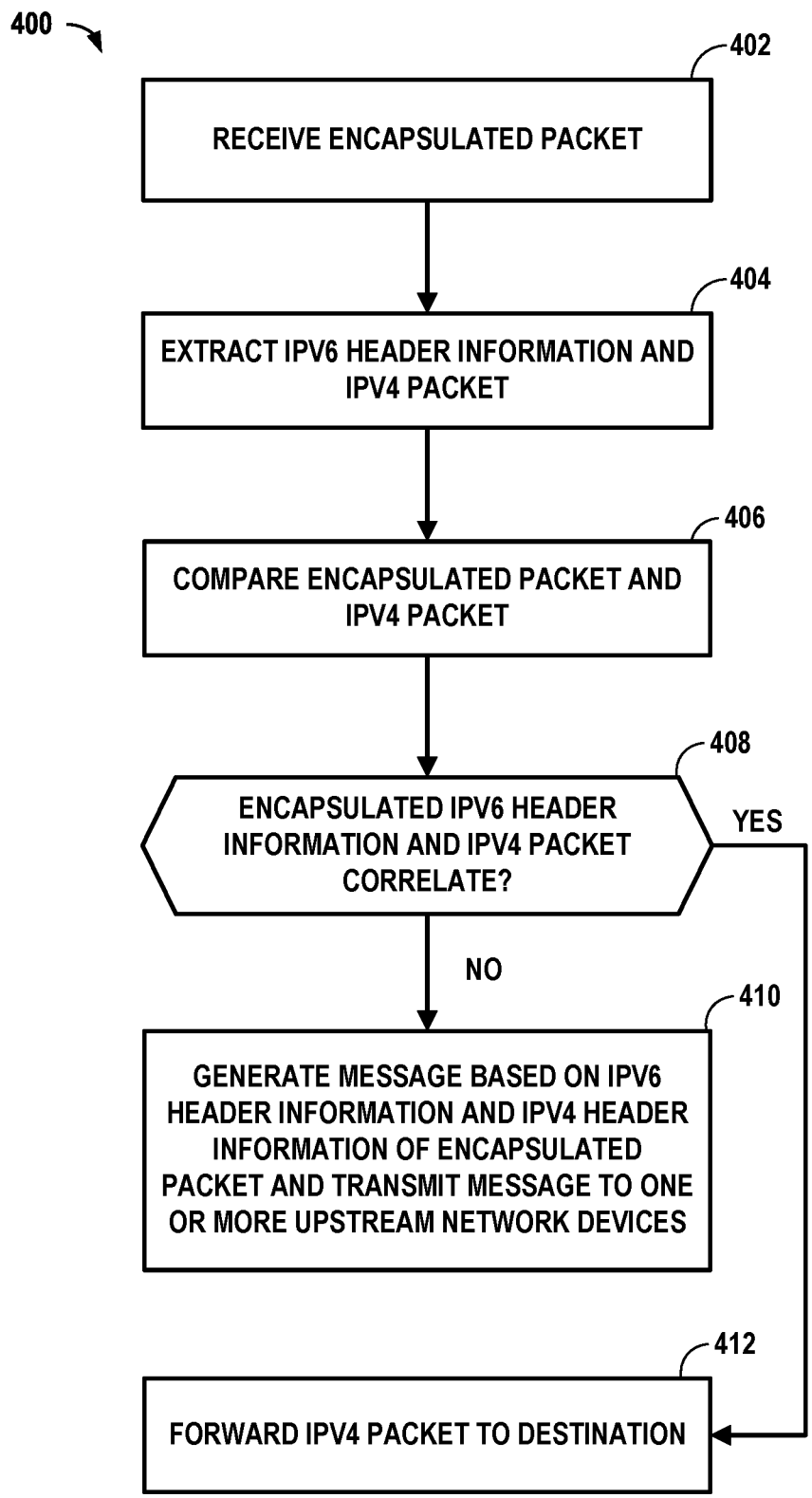
FIG. 4 is a flowchart illustrating an example method for triggering security actions against spoofing in accordance to techniques of this disclosure.

FIG. 4 is a flowchart illustrating an example method 400 for triggering security actions against spoofing in accordance to techniques of this disclosure. For purposes of example and explanation, method 400 of FIG. 4 is explained with respect to network device 110 of FIGS. 1 and 2. However, it should be understood that other network devices may be configured to perform this or a similar method.

Initially, network device 110 receives an encapsulated packet (e.g., encapsulated IPv6 packet 310 of FIG. 3B) (402). For purposes of example and explanation, the encapsulated packet may comprise an IPv4 packet encapsulated into an IPv6 packet using MAP-E. However, it is understood that a similar method may be performed to an IPv6 packet encapsulated into an IPv4 packet and/or using another relay/encapsulation technology. In some examples, network device 110 receives the encapsulated packet via a network tunnel (e.g., network tunnel 108 of FIG. 1) configured to transport the encapsulated packet from a tunnel entry point (e.g., TEP 106 of FIG. 1) to network device 110.

Network device 110 extracts IPv6 header information and the IPv4 packet from the encapsulated packet (404). For example, network 110 may extract IPv6 headers 312 and IPv6 payload 314, which comprises IPv4 packet 300 of FIG. 3A, from IPv6 encapsulated packet 310 of FIG. 3A. Network 100 may also extract IPv4 headers from IPv4 payload 314. Network device 110 then compares extracted IPv6 header information and the IPv4 packet (406) to determine whether the encapsulated IPv6 header information matches (e.g., correlates) to the IPv4 packet (408). For example, network device 110 may determine a respective IPv6 source address from the IPv4 source address and the IPv4 source port of the IPv4 packet and compare the respective IPv6 source address to the IPv6 source address from the IPv6 header information of the encapsulated packet, and determine whether the respective IPv6 source address matches (e.g., correlates) to the IPv6 source address of the encapsulated packet. In other examples, network device 110 may extract a respective IPv4 source address and a respective IPv4 source port number from the IPv6 source address of IPv6 header information of the encapsulated packet, and determine whether the respective IPv4 source address and respective IPv4 source port number correlate to the IPv4 source address and the IPv4 source port number of the IPv4 packet contained within the encapsulated packet. Either way, network device 110 may determine whether the IPv6 header information matches (e.g., correlates) to the IPv4 packet contained within the encapsulated packet. If the IPv6 header information matches (e.g., correlates) to the IPv4 packet contained within the encapsulated packet (YES branch of 408), the encapsulated packet is valid and network device 110 may forward the IPv4 packet to destination network 114 (412). In some examples, network device 110 forwards the encapsulated packet, including the IPv4 header, to destination network 114.

If the IPv6 header information does not correspond to the IPv4 header information of the encapsulated packet (NO branch of 408), the encapsulated packet is an invalid spoofed packet because it originated from an unknown source (e.g., other than CD 102 or CPE 104 of FIG. 1) and network device 110 may generate a message (e.g. message 118) with an instruction to drop, rate limit, or redirect future packets based on the IPv4 packet header information and IPv6 packet header information extracted from the spoofed encapsulated packet (e.g., as described below with reference to any of FIGS. 6A-8B) and transmit, via a peering session (e.g., using eBGP, iBGP, MP-BGP, or any other border gateway protocol), the message to one or more upstream network devices (e.g., TEP device 106) (410). In some examples, network device 110 may also eschew forwarding the IPv4 packet to destination network 114 and drop the encapsulated packet.

In some examples, the message may comprise an BGP NLRI message. For example, the message may extend FlowSpec to include outer (e.g., IPv6) header type and inner (e.g., IPv4) header type components of an encapsulated packet to match. In particular, the message may include one or more outer header type components, such as source IPv6 address or destination IPv6 address, and one or more inner header type components, such as an IPv4 protocol, a source IPv4 address, a source IPv4 port number, a destination IPv4 address, or a destination IPv4 port number. Further example details regarding FlowSpec can be found in in P. Marques, et al., "Dissemination of Flow Specification Rules", RFC 5575, August 2009, available at https://tools.ietf.org/html/rfc5575, the entire contents of which is incorporated by reference in its entirety. In some examples, the message 118 may comprise ACL actions or rules for filtering spoofed encapsulated packets based on outer and inner header information. Either way, the message may define the combination of IPv6 header and IPv4 header values of encapsulated packets to drop, rate limit, or redirect at the one or more upstream network devices. In this way, network resources will not be unnecessarily consumed by spoofed packets.

Figure 5:
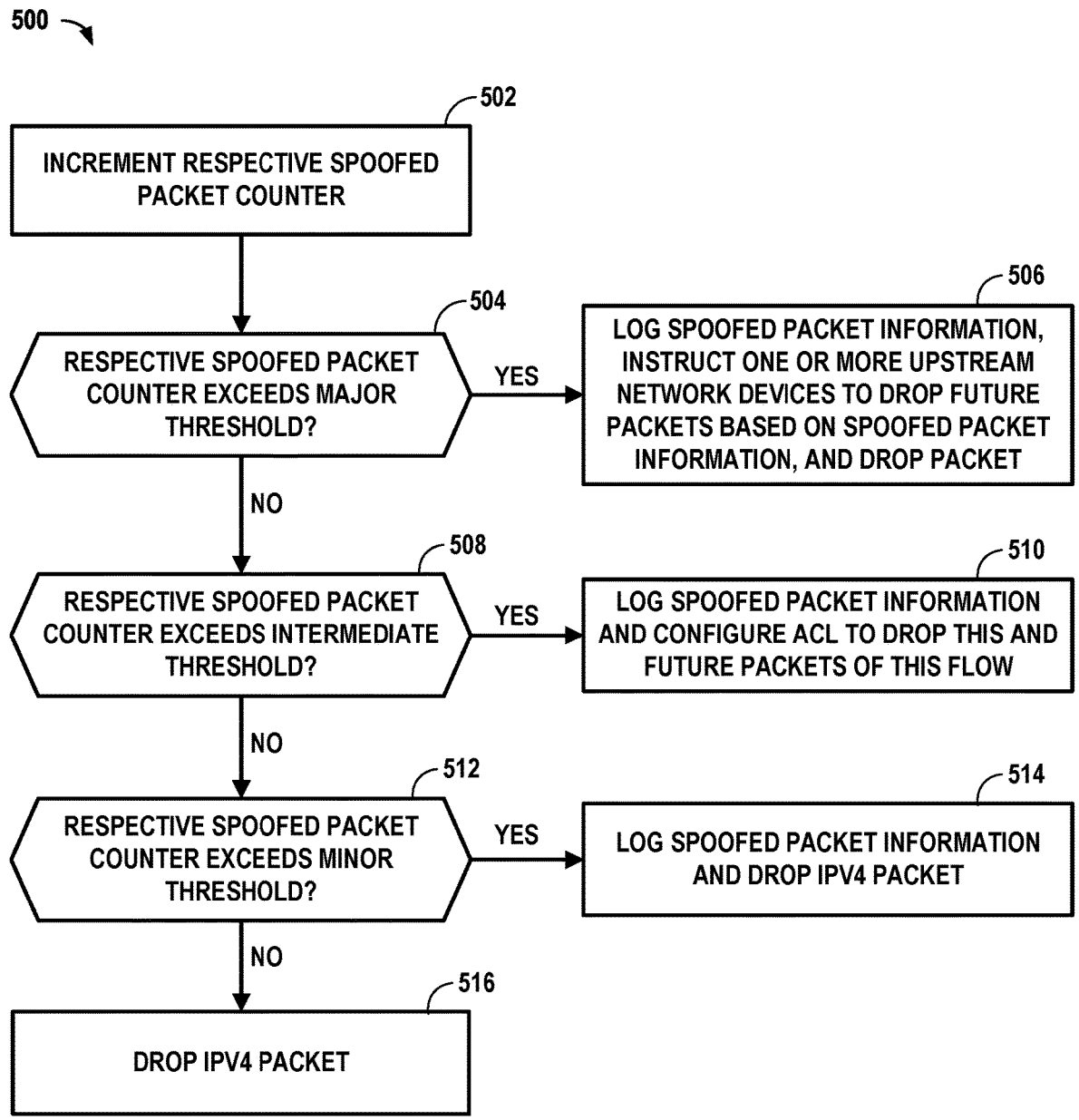
FIG. 5 is a flowchart illustrating an example operations for performing security actions against spoofing in accordance to techniques of this disclosure.

FIG. 5 is a flowchart 500 illustrating an example operations for performing security actions against spoofing in accordance to techniques of this disclosure. Flowchart 500 is one example of the functions performed by network device 110 at step 410 of FIG. 4.

Network device 110 may increment a respective spoofed packet counter in response to detecting a spoofed packet (502). In some examples, network packet 110 may maintain a separate respective spoofed packet counter for each CD, CEP, TEP, and/or network tunnel and increment the respective spoofed packet counter each time a spoofed packet allegedly from that CD, CEP, TEP, or network tunnel is detected at network device 110. For example, network device 110 may maintain a first spoofed packet counter for CEP 104 and network device 110 may increment that first spoofed packet counter for every spoofed encapsulated packet it detects that allegedly came from CEP 104. In this way, network device 110 may determine when a malicious actor is spoofing packets by making them appear to be coming from CEP 104. In some examples, network device 110 may similarly maintain respective spoofed packet counters for CE 102 and/or network tunnel 116.

Network device 110 may determine whether the respective spoofed packet counter exceeds one or more thresholds, which may mean that a DoS or DDoS attach is occurring. In some examples, the one or more security actions performed by network device 110 may depend on the number detected spoofed packets (i.e., the value of the respective spoofed packet counter). For example, network device 110 may determine whether a respective spoofed packet counter exceeds a major threshold (e.g., a value high enough to detect a DoS or DDoS attack) (504). In response to determining that the respective spoofed packet counter exceeds the major threshold (YES branch of 504), network device 110 may transmit a message to one or more upstream network devices with an instruction to drop future packets at the one or more upstream network devices based on IPv4 packet header information and IPv6 packet header information extracted from the spoofed packet, log information about the spoofed packet, and drop the spoofed packet (506). For example, network device 110 may transmit message 118 to TEP 106, log IPv6 header information and/or IPv4 header information extracted from the spoofed packet, including IPv6 source address, IPv6 destination address, IPv4 source address, IPv4 source port number, and/or IPv4 destination port number, and drop the spoofed packet (e.g., as described above with respect to FIGS. 1 and 2). In this way, network device 110 may help prevent DoS attacks or DDoS attacks at the one or more upstream network devices, before network resource are unnecessarily consumed by routing spoofed packets.

In response to determining that the respective spoofed packet counter does not exceed the major threshold (NO branch of 504), network device 110 may determine whether a respective spoofed packet counter exceeds an intermediate threshold (e.g., lower than the major threshold) (508). In response to determining that the respective spoofed packet counter exceeds the intermediate threshold (YES branch of 508), network device 110 may log IPv6 header information and/or IPv4 header information extracted from the spoofed packet, including IPv6 source address, IPv6 destination address, IPv4 source address, IPv4 source port number, and/or IPv4 destination port number, and configure an ACL action or rule to drop this and future spoofed packets based on outer and inner header information the spoofed packet (e.g., as described above with respect to FIGS. 1 and 2) without sending an instruction to drop future packets at the one or more upstream network devices based on IPv4 packet header information and IPv6 packet header information extracted from the spoofed packet (510). In some examples, steps 508 or 510 may not be performed (i.e., network device may not check whether an intermediate threshold is exceeded) and network device 110 may determine whether a respective spoofed packet counter exceeds a minor threshold (e.g., lower than the major threshold) (512) in response to determining that the respective spoofed packet counter does not exceed the major threshold (continue to 512 from NO branch of 504).

In response to determining that the respective spoofed packet counter does not exceed the intermediate threshold (NO branch of 508), network device 110 may determine whether a respective spoofed packet counter exceeds a minor threshold (e.g., lower than the major and intermediate thresholds) (512). In response to determining that the respective spoofed packet counter exceeds the minor threshold (YES branch of 512), network device 110 may log IPv6 header information and/or IPv4 header information extracted from the spoofed packet, including IPv6 source address, IPv6 destination address, IPv4 source address, IPv4 source port number, and/or IPv4 destination port number, and drop the IPv4 packet without sending an instruction to drop future packets at the one or more upstream network devices based on IPv4 packet header information and IPv6 packet header information extracted from the spoofed packet (514). In response to determining that the respective spoofed packet counter does not exceed the minor threshold (NO branch of 512), network device 110 may drop the IPv4 packet without logging information about the spoofed packet or sending with an instruction to drop future packets at the one or more upstream network devices based on IPv4 packet header information and IPv6 packet header information extracted from the spoofed packet (516). By not logging information about the spoofed packet or sending an instruction to drop future packets at the one or more upstream network devices based on IPv4 packet header information and IPv6 packet header information extracted from the spoofed packet, network device 110 does not prematurely interfere with packet flow traffic (including valid packet flow traffic).

Figure 6A:
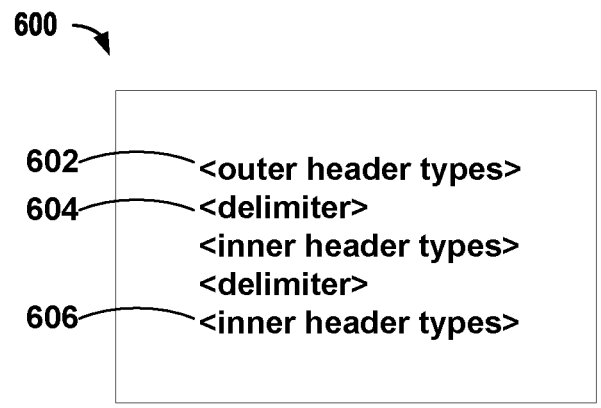
FIG. 6A is an illustration showing an example message template in accordance to techniques of this disclosure.

FIG. 6A is an illustrations showing an example message template 600 in accordance to techniques of this disclosure. In some examples, message template 600 may extend FlowSpec to include nested header type components (e.g., both IPv4 and IPv6 NLRI types of encapsulated packets). In particular, message template 600 may include outer header types and inner header types of an encapsulated packet to match for triggering certain FlowSpec Actions (e.g., to drop, rate limit, or redirect packets). In some examples, message template 600 may be used for upstream devices that are inner header aware. That is, for upstream devices that may extract inner IPv4 header information from encapsulated IPv6 packets without the need for additional information.

As shown in FIG. 6A, message template 600 includes outer header types 602, delimiters 604, and inner header types 606. In addition, message template 600 may include FlowSpec Actions, including Traffic-Rate and/or Redirect to indicate that packets matching outer header types 602 and inner header types 606 should be rate limited (or dropped) or redirected, respectively.

In some examples, outer header types may include any IPv6 header information from an encapsulated packet, such as source IPv6 address, destination IPv6 address, and the like. Inner header types 606 may include any IPv4 header information from the IPv4 packet in the encapsulated packet, such as an IPv4 protocol, a source IPv4 address, a source IPv4 port number, a destination IPv4 address, a destination IPv4 port number, and the like. In some examples, message template 600 may include any other FlowSpec NLRI types as part of outer header types 602 or inner header types 606. Delimiters 604 separate outer header types 602 and inner header types 606. In some examples, delimiters 604 separate inner header types 606 and other inner header types 606.

Figure 6B:
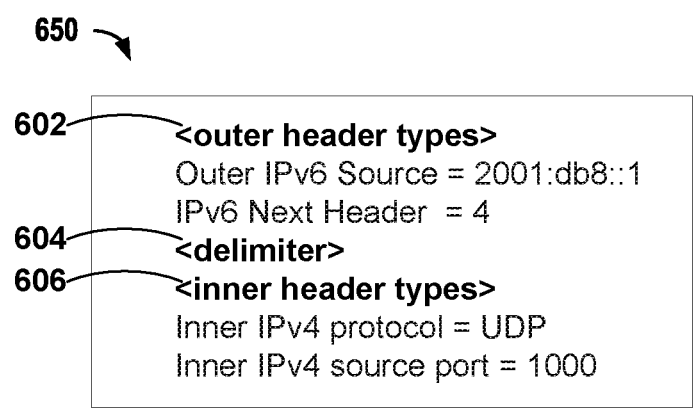
FIG. 6B is an illustration showing example message data from a network device to an upstream device in accordance to techniques of this disclosure.

FIG. 6B is an illustration showing example message data 650 from a network device (e.g., network device 110) to an upstream device (e.g., TEP 106) in accordance to techniques of this disclosure. In this example, outer header types 602 include an outer IPv6 source address of "2001:db8::1" and a next header value of "4" indicating that inner header types 606 correspond to an IPv4 packet. Inner header types 606 include inner IPv4 protocol of "UDP" and inner IPv4 source port number of "1000". In this example, the upstream device would perform the FlowSpec Action (not shown) in message data 650 when it receives a packet with an outer IPv6 source address of "2001:db8::1", inner IPv4 protocol of "UDP", and inner IPv4 source port number of "1000". For example, the FlowSpec Action may be to drop, rate limit, or redirect any packets matching these outer header types 602 and inner header types 606.

Figure 7A:
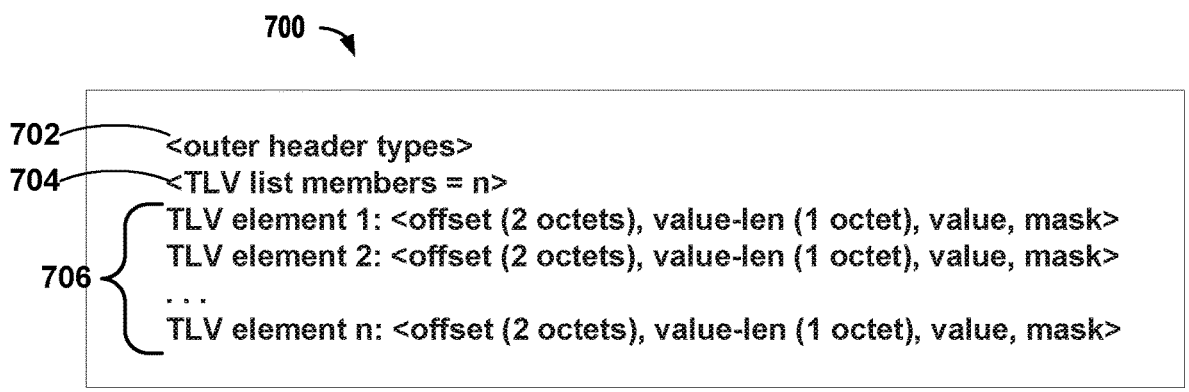
FIG. 7A is an illustration showing an example message template in accordance to techniques of this disclosure.

FIG. 7A is an illustration showing an example message template 700 in accordance to techniques of this disclosure. In some examples, message template 700 may extend FlowSpec to include nested header type components (e.g., both IPv4 and IPv6 NLRI types of encapsulated packets). In particular, message template 700 may include outer header types and type-length-value (TLV) data structures representing inner header types of an encapsulated packet to match for triggering certain FlowSpec Actions (e.g., to drop, rate limit, or redirect packets). In some examples, message template 700 may be used for upstream devices that are not inner header aware. That is, for upstream devices that cannot extract inner IPv4 header information from encapsulated IPv6 packets without additional information.

As shown in FIG. 7A, message template 700 includes outer header types 702, number of TLV members 704, and TLV data structures 706. In addition, message template 700 may include FlowSpec Actions, including Traffic-Rate and/or Redirect to indicate that packets matching outer header types 702 and inner header values from TLV data structures 706 should be rate limited (or dropped) or redirected, respectively.

In some examples, outer header types may include any IPv6 header information from an encapsulated packet, such as source IPv6 address, destination IPv6 address, and the like. TLV data structures 706 may include an "offset" representing the number of bytes after the outer header of the encapsulated packet a particular TLV value is located (e.g., where the inner header value is located), the "value-len" indicating length of the value, the "value" representing the inner header value to match, and a "mask" to, optionally, apply to the bytes identified by the "offset" and "value-len". TLV data structures 706 may include values for any IPv4 header information from the IPv4 packet in the encapsulated packet, such as an IPv4 protocol, a source IPv4 address, a source IPv4 port number, a destination IPv4 address, a destination IPv4 port number, IPv4 DIP, GRE protocol type, and the like. In some examples, message template 700 may include any other FlowSpec NLRI types as part of outer header types 702 or TLV data structures 706.

Figure 7B:
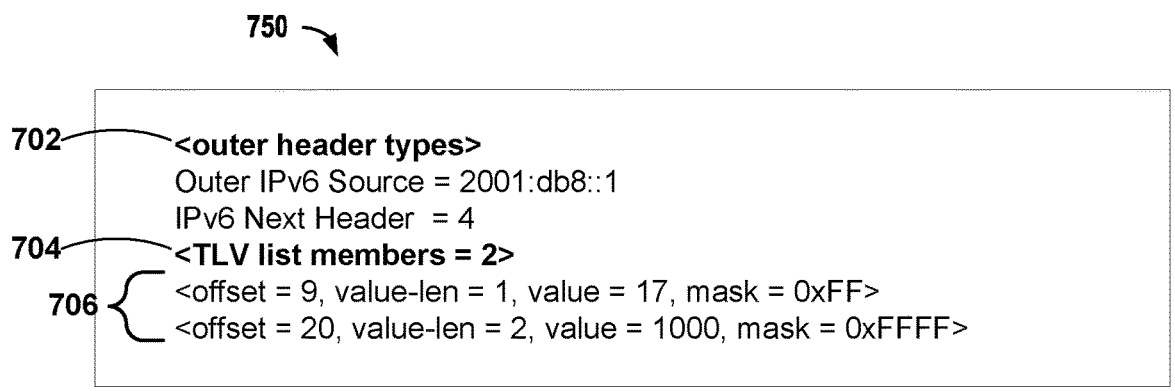
FIG. 7B is an illustration showing example message data from a network device to an upstream device in accordance to techniques of this disclosure.

FIG. 7B is an illustration showing example message data 750 from a network device (e.g., network device 110) to an upstream device (TEP 106) in accordance with techniques of this disclosure. In this example, outer header types 702 include an outer IPv6 source address of "2001:db8::1" and a next header value of "4" indicating that inner header types correspond to an IPv4 packet. The number of TLV members 704 is "2". TLV data structures 706 comprise two values corresponding to IPv4 protocol and IPv4 port number. In particular, TLV structures 706 indicate that the upstream device should map an inner IPv4 protocol to "17" (corresponding to UDP) and inner IPv4 source port number of "1000". In this example, the upstream device would perform the FlowSpec Action (not shown) in message 750 when it receives a packet with an outer IPv6 source address of "2001:db8::1", inner IPv4 protocol of "UDP", and inner IPv4 source port number of "1000". For example, the FlowSpec Action may be to drop, rate limit, or redirect any packets matching these outer header types 702 and inner header types values from TLV data structures 706.

Figure 8A:
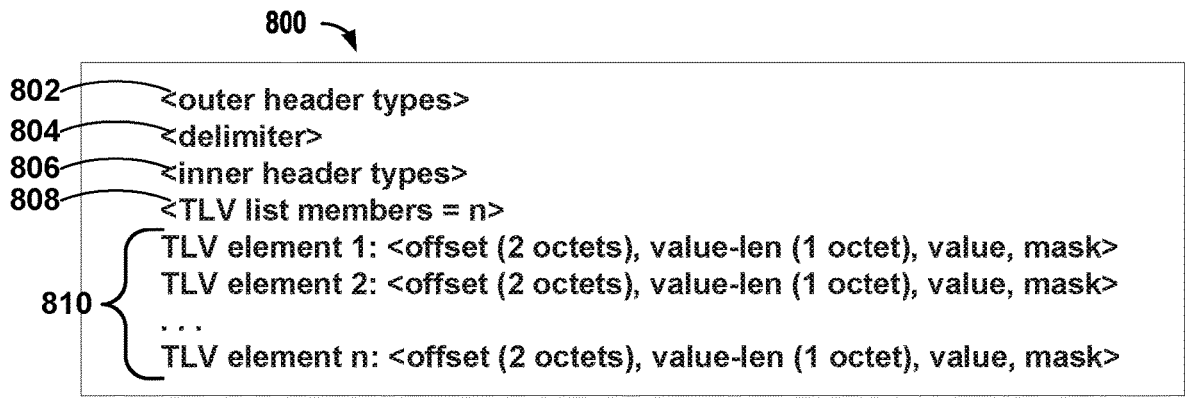
FIG. 8A is an illustration showing an example message template in accordance to techniques of this disclosure.

FIG. 8A is an illustration showing an example message template 800 in accordance to techniques of this disclosure. In some examples, message template 800 may extend FlowSpec to include nested header type components (e.g., both IPv4 and IPv6 NLRI types of encapsulated packets). In particular, message template 800 may include outer header types and inner header types of an encapsulated packet to match for triggering certain FlowSpec Actions (e.g., to drop, rate limit, or redirect packets). In some examples, message template 800 may be used for upstream devices that are inner header aware for certain inner header types but not others.

As shown in FIG. 8A, message template 800 includes outer header types 802, delimiters 804, inner header types 806, number of TLV members 808, and TLV data structures 810. In addition, message template 800 may include FlowSpec Actions, including Traffic-Rate and/or Redirect to indicate that packets matching outer header types 802, inner header types 804, and/or inner header values from TLV data structures 810 should be rate limited (or dropped) or redirected respectively.

In some examples, outer header types may include any IPv6 header information from an encapsulated packet, such as source IPv6 address, destination IPv6 address, and the like. Inner header types 806 may include any IPv4 header information from the IPv4 packet in the encapsulated packet, such as an IPv4 protocol, a source IPv4 address, a source IPv4 port number, a destination IPv4 address, a destination IPv4 port number, and the like. TLV data structures 810 may include an "offset" representing the number of bytes after the outer header of the encapsulated packet a particular TLV value is located (e.g., where the inner header value is located), the "value-len" indicating length of the value, the "value" representing the inner header value to match, and a "mask" to, optionally, apply to the bytes identified by the "offset" and "value-len". TLV data structures 810 may include values for any IPv4 header information from the IPv4 packet in the encapsulated packet, such as an IPv4 protocol, a source IPv4 address, a source IPv4 port number, a destination IPv4 address, a destination IPv4 port number, IPv4 DIP, GRE protocol type, and the like. In some examples, message template 800 may include any other FlowSpec NLRI types as part of outer header types 802, inner header types 806, or TLV data structures 810. Delimiters 804 separate outer header types 802 and inner header types 806.

Figure 8B:
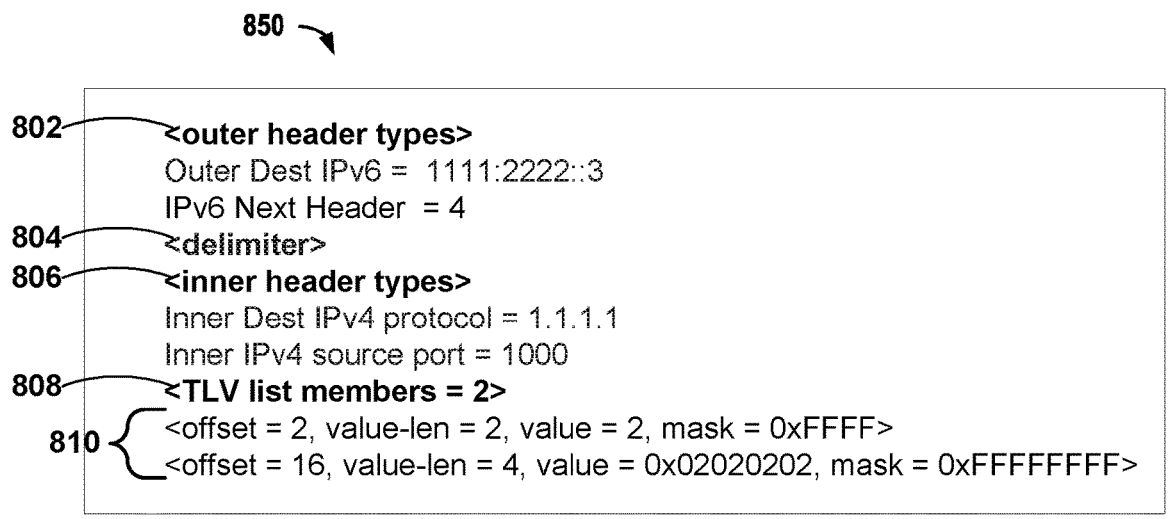
FIG. 8B is an illustration showing example message data from a network device to an upstream device in accordance to techniques of this disclosure.

FIG. 8B is an illustration showing example message data from a network device (e.g., network device 110) to an upstream device (e.g., TEP 106) in accordance to techniques of this disclosure. In this example, outer header types 802 include an outer IPv6 destination address of "1111:2222::3" and a next header value of "4" indicating that inner header types correspond to an IPv4 packet. Inner header types 806 include inner IPv4 DIP of "1.1.1.1" and inner IPv4 source port number of "1000". The number of TLV members 808 is "2". TLV data structures 810 comprise two values corresponding to GRE IPv4 protocol and inner most IPv4 DIP. In particular, TLV structures 810 indicate that the upstream device should map GRE IPv4 protocol to "4" and inner most IPv4 DIP to "0x02020202". In this example, the upstream device would perform the FlowSpec Action (not shown) in message 850 when it receives a packet with an outer IPv6 destination address of "1111:2222::3", inner IPv4 DIP of "1.1.1.1", inner IPv4 source port number of "1000", GRE IPv4 protocol to "4", and inner most IPv4 DIP to "0x02020202". For example, the FlowSpec Action may be to drop, rate limit, or redirect any packets matching these outer header types 802, inner header types 806, and inner header types values from TLV data structures 810.

Figure 9:
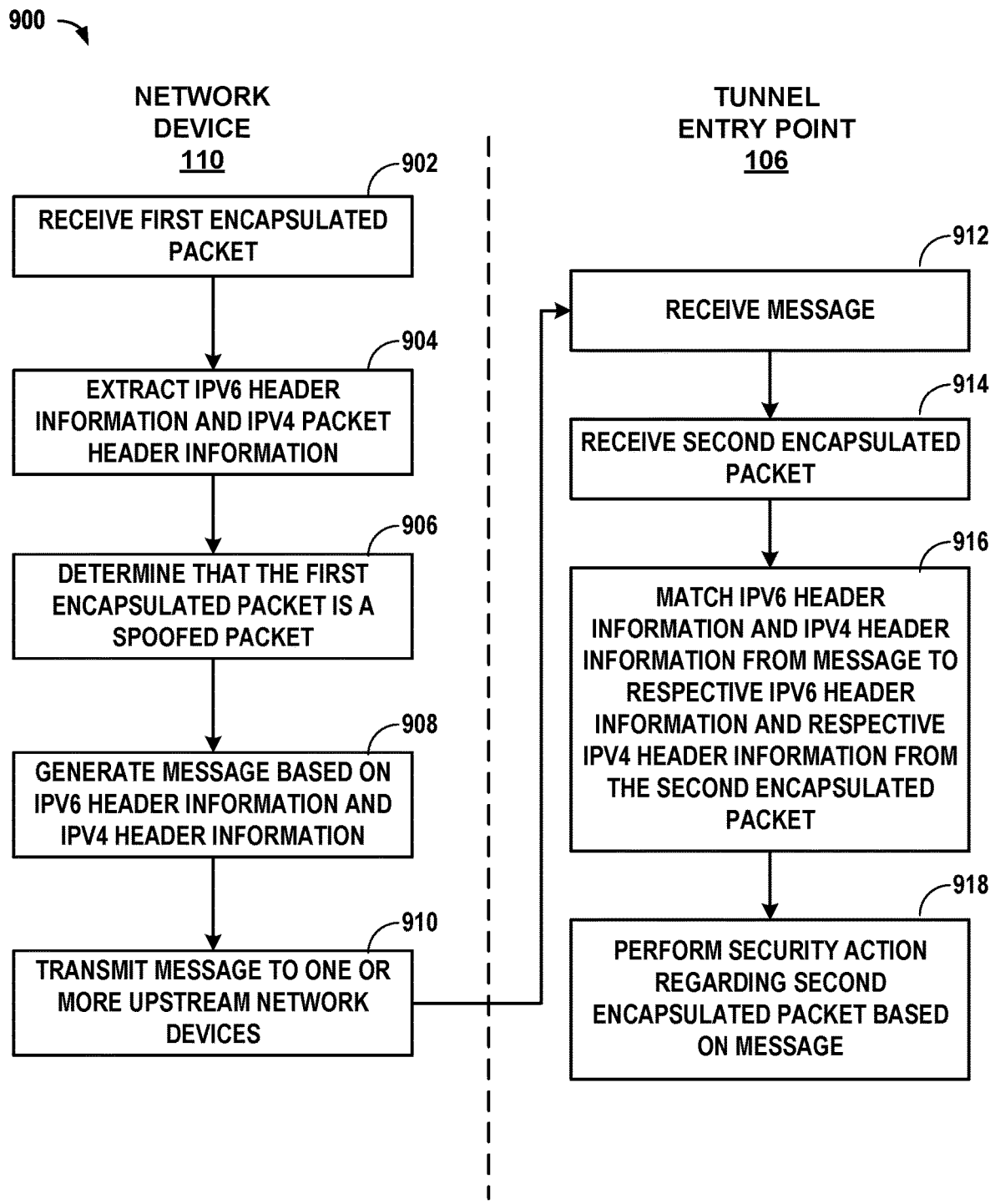
FIG. 9 is a flowchart illustrating example operations against spoofing in accordance to techniques of this disclosure.

FIG. 9 is a flowchart 900 illustrating example operations against spoofing in accordance to techniques of this disclosure. For purposes of example and explanation, method 900 of FIG. 9 is explained with respect to network device 110 and TEP 106 of FIG. 1. However, it should be understood that other network devices may be configured to perform this or a similar method.

Initially, network device 110 receives a first encapsulated packet (e.g., encapsulated IPv6 packet 310 of FIG. 3B) (902). Network device 110 extracts IPv6 header information from the outer header of the first encapsulated packet and IPv4 header information from the inner header of the first encapsulated packet (904).

Network device 110 then compares extracted IPv6 header information and the extracted IPv4 header information and determines whether the first encapsulated packet is a spoofed packet (906). For example, network device 110 may determine a respective IPv6 source address from the IPv4 source address and the IPv4 source port of the IPv4 header information, compare the respective IPv6 source address to the IPv6 source address from the IPv6 header information of the first encapsulated packet, and determine that the respective IPv6 source address does not match the IPv6 source address of the first encapsulated packet. In other examples, network device 110 may extract a respective IPv4 source address and a respective IPv4 source port number from the IPv6 source address of IPv6 header information of the first encapsulated packet and determine that the respective IPv4 source address and respective IPv4 source port number do not match the IPv4 source address and the IPv4 source port number of the IPv4 information of inner header of the first encapsulated packet. Either way, network device 110 determines that the IPv6 header information does not match (e.g., correlate) to the IPv4 header information of the first encapsulated packet.

Network device 110 then generate a message (e.g. message 118) with an instruction to drop, rate limit, or redirect future packets based on the IPv4 packet header information and IPv6 packet header information extracted from the spoofed encapsulated packet (e.g., as described above with reference to any of FIGS. 6A-8B) (908) and transmits, via a peering session (e.g., using eBGP, iBGP, MP-BGP, or any other border gateway protocol), the message to one or more upstream network devices (e.g., TEP device 106) (910). In some examples, network device 110 may also eschew forwarding the IPv4 packet to destination network 114 and drop the encapsulated packet.

TEP device 106 may receive the message from network device 110 (912). The message may include an instruction to drop, rate limit, or redirect future encapsulated packets with respective IPv6 header information and respective IPv4 header information matching the IPv6 header information and the IPv4 header information in the message. In some examples, TEP device 106 may store this instruction as a filter, rule, or ACL action.

TEP device 106 may subsequently receive a second encapsulated packet for forwarding through network tunnel 116 to network device 110 based on the respective IPv6 header information of the second encapsulated packet (e.g., as described above with reference to FIG. 1) (914). TEP device 106 may match the IPv6 header information and the IPv4 header information from the message to the respective IPv6 header information and respective IPv4 header information of the second encapsulated packet (916), and determine that the second encapsulated packet is a spoofed packet. In response to determining that the second encapsulated packet is a spoofed packet, TEP device 106 may perform one or more security actions regarding the IPv4 packet as outlined in the message (918). For example, TEP device 106 may eschew forwarding the IPv4 packet to network device 110 and drop the encapsulated packet. In some examples, TEP device may rate limit or redirect the encapsulated packet as outlined in the message. Either way, TEP device 106 may help prevent the spoofed packet from consuming intermediate network 108, network tunnel 116, and/or network device 110 resources.

Figure 10A:
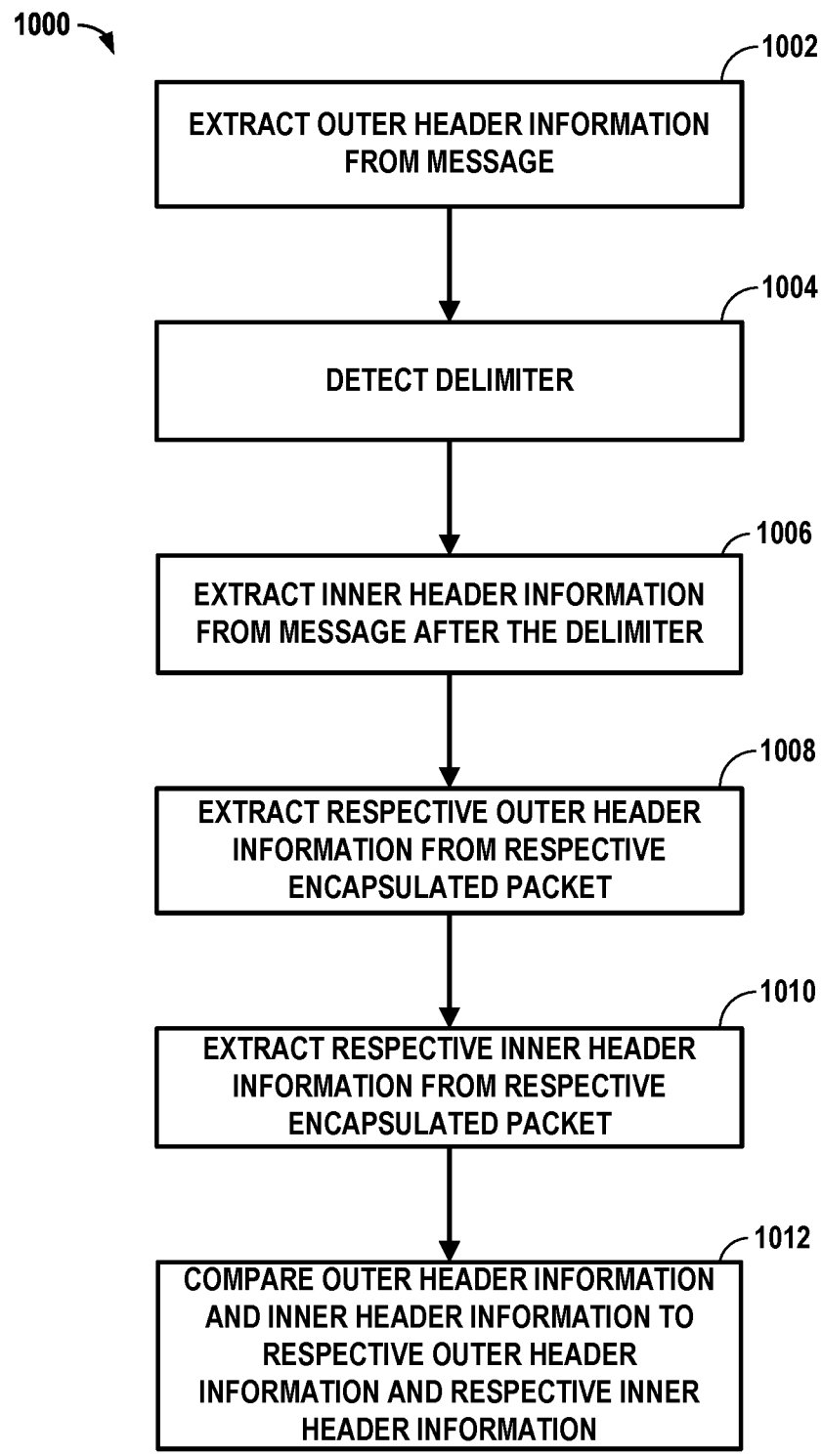
FIGS. 10A-10C are flowcharts illustrating example operations for matching header information from a message to respective header information from an encapsulated packet in accordance to techniques of this disclosure.

FIG. 10A is a flowchart 1000 illustrating example operations for matching header information from message data 650 of FIG. 6B to respective header information from an encapsulated packet in accordance to techniques of this disclosure. Flowchart 1000 is one example of the functions performed by TEP device 106 at step 916 of FIG. 9.

Initially, TEP device 106 extracts outer header information (e.g., outer IPv6 source address of outer header types 602) from message 650 (1002). TEP device 106 then detects delimiter 604 in message 650 (1004) and extracts inner header information (e.g., inner IPv4 protocol and inner IPv4 source port number of inner header types 606) after delimiter 604 from message 650 (1006).

TEP device 106 extracts respective outer header information from a respective encapsulated packet (e.g., the second encapsulated packet received at step 914 of FIG. 9) (1008). TEP device 106 also extracts respective inner header information from the respective encapsulated packet (1010). In this example, TEP device 106 is inner header aware and may extract the respective inner header information without additional information. TEP device 106 then compares and matches the outer header information and the inner header information extracted from message 650 to the respective outer header information and respective inner header information extracted from the respective encapsulated packet (1012).

Figure 10B:
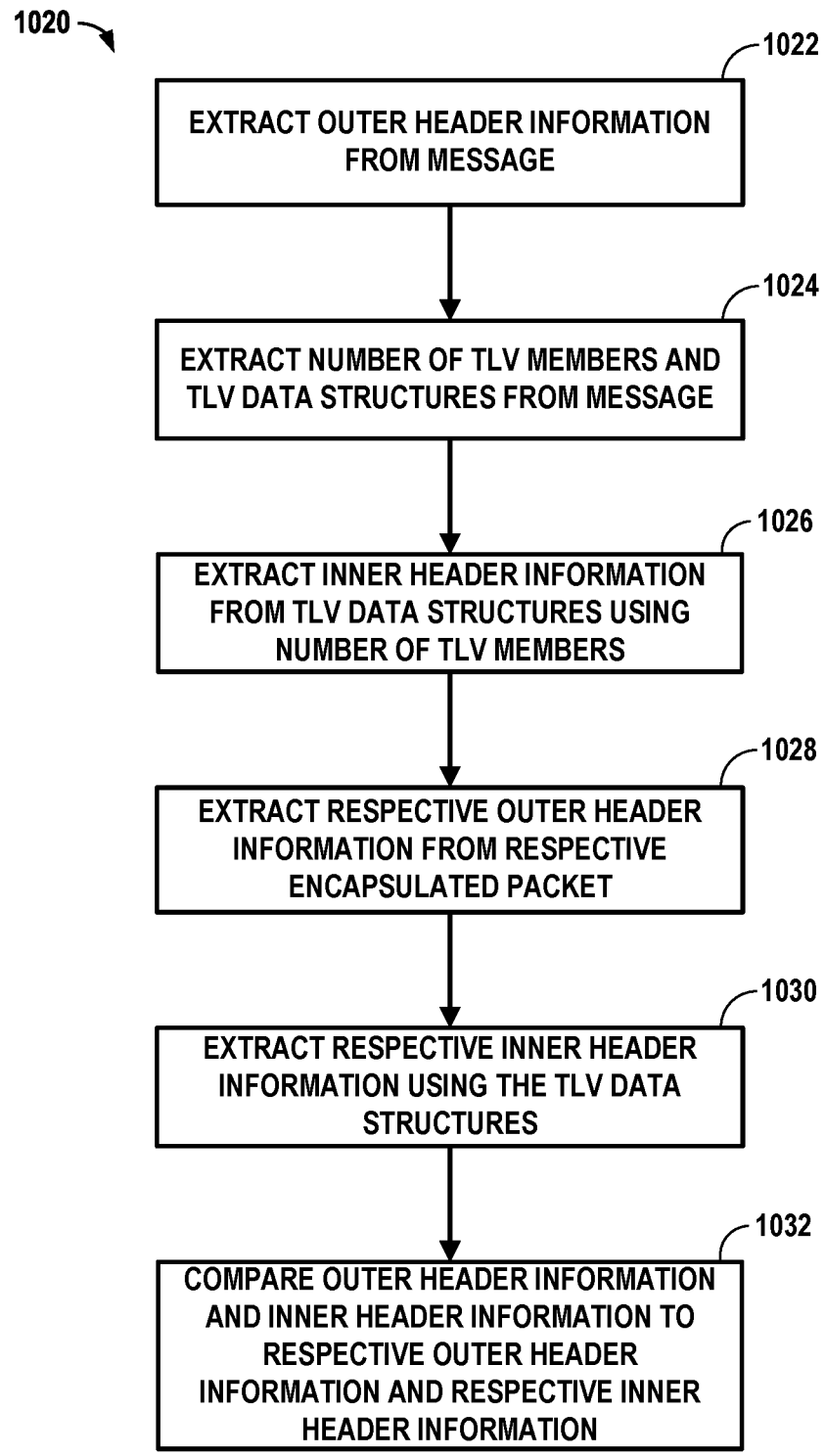

FIG. 10B is a flowchart 1020 illustrating example operations for matching header information from message data 750 of FIG. 7B to respective header information from an encapsulated packet in accordance to techniques of this disclosure. Flowchart 1020 is one example of the functions performed by TEP device 106 at step 916 of FIG. 9.

Initially, TEP device 106 extracts outer header information (e.g., outer IPv6 source address of outer header types 702) from message 750 (1022). TEP device 106 then extracts number of TLV members 704 and TLV data structures 706 from message 750 (1024). TEP device 106 also extracts the inner header information (e.g., inner IPv4 protocol and inner IPv4 source port number) from TLV data structures 706 of message 750 using the number of TLV members 704 (1026).

TEP device 106 extracts respective outer header information from a respective encapsulated packet (e.g., the second encapsulated packet received at step 914 of FIG. 9) (1028). TEP device 106 also extracts respective inner header information from the respective encapsulated packet using TLV data structures 706 from message 750 (1030). In this example, TEP device 106 is not inner header aware and cannot extract the respective inner header information without additional information. For example, for each of the number of TLV members 704 (e.g., two in message 750 of FIG. 7B), TEP device 106 identifies the start and length of the respective inner header element in the respective encapsulated packet using the "offset" and "value-len" of respective TLV data structures 706 and extracts the respective inner header element. The extracted respective inner header elements form the respective inner header information of the respective encapsulated packet. TEP device 106 then compares and matches the outer header information and the inner header information extracted from message 750 to the respective outer header information and respective inner header information extracted from the respective encapsulated packet (1032).

Figure 10C:
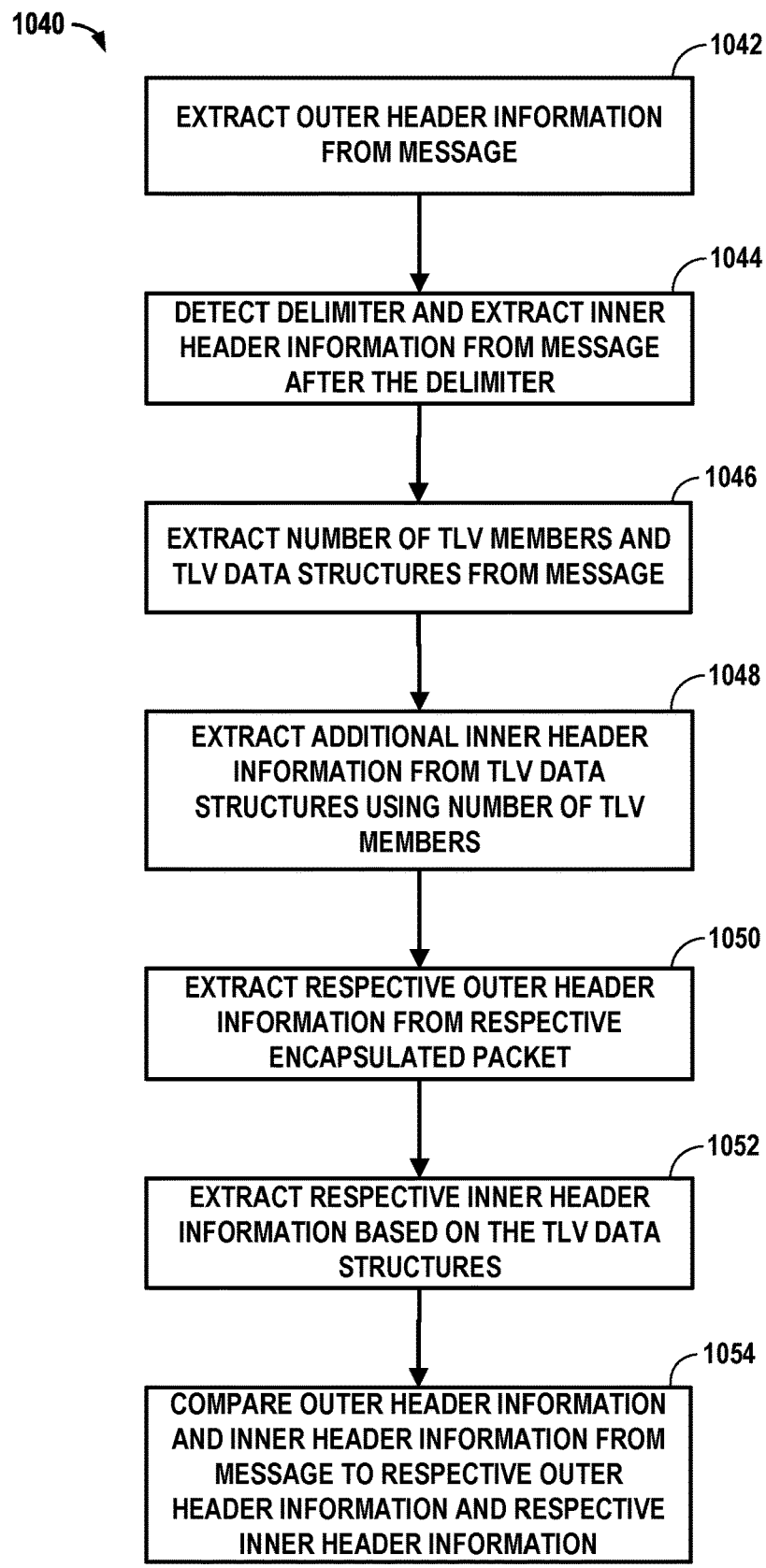

FIG. 10C is a flowchart 1040 illustrating example operations for matching header information from message data 850 of FIG. 8B to respective header information from an encapsulated packet in accordance to techniques of this disclosure. Flowchart 1040 is one example of the functions performed by TEP device 106 at step 916 of FIG. 9.

Initially, TEP device 106 extracts outer header information (e.g., outer IPv6 destination address of outer header types 802) from message 850 (1042). TEP device 106 then detects delimiter 804 in message 850 and extracts at least some inner header information (e.g., inner destination IPv4 protocol and inner IPv4 source port number of inner header types 806) after delimiter 804 from message 850 (1044).

TEP device 106 then extracts number of TLV members 808 and TLV data structures 810 from message 850 (1046). TEP device 106 also extracts additional inner header information (e.g., GRE IPv4 protocol and inner most IPv4 DIP) from TLV data structures 810 of message 850 using number of TLV members 808 (1048).

TEP device 106 extracts respective outer header information from a respective encapsulated packet (e.g., the second encapsulated packet received at step 914 of FIG. 9) (1050). TEP device 106 also extracts at least some respective inner header information from the respective encapsulated packet without using TLV data structures 810 and at least some more respective inner header information using TLV data structures 810 from message 850 (1052). In this example, TEP device 106 is inner header aware for certain inner header types but not others and may only extract some of the respective inner header information without additional information. For example, TEP device 106 may extract the at least some respective inner header information for certain inner header types without additional information and, for each of the number of TLV members 808 (e.g., two in message 850 of FIG. 8B), TEP device 106 identifies start and length of the respective inner header element in the respective encapsulated packet using the "offset" and "value-len" the respective TLV data structures 706 and extracts the respective inner header element. The extracted at least some respective inner header information and the extracted respective inner header elements form the respective inner header information of the respective encapsulated packet. TEP device 106 then compares and matches the outer header information and the inner header information extracted from message 850 to the respective outer header information and respective inner header information extracted from the respective encapsulated packet (1054).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various examples have been described. These and other examples are within the scope of the following claims.

What is claimed is:

1. A system comprising one or more processors implemented in circuitry and configured to:
receive an encapsulated network packet via a network tunnel of an IPv6 network, wherein a Tunnel Entry Point (TEP) routing device acts as an entry point to the network tunnel within the IPv6 network, and wherein the network device acts as a termination point of the network tunnel;
extract IPv6 header information from the encapsulated network packet;
extract IPv4 header information from the encapsulated network packet;
determine that the encapsulated network packet is a spoofed network packet, wherein to determine that the encapsulated network packet is the spoofed network packet, the one or more processors are configured to:
determine respective IPv6 header information from the IPv4 header information;
compare the extracted IPv6 header information with the determined, respective IPv6 header information; and
determine that the extracted IPv6 header information does not match the determined, respective IPv6 header information; and
in response to detecting the spoofed network packet, transmit a message to the TEP routing device, the message including data representing the IPv6 header information and IPv4 header information and indicating that the IPv6 header information was spoofed.

2. The system of claim 1, wherein the one or more processors are further configured to:
increment a spoofed packet counter for detected spoofed network packet corresponding to the network tunnel; and
log at least some IPv6 header information and at least some IPv4 header information in response to detecting the spoofed network packet and a determination that the spoofed packet counter exceeds a minor threshold.

3. The system of claim 2, wherein the one or more processors are configured to transmit the message to the TEP routing device in response to determining that the spoofed packet counter exceeds an intermediate threshold, higher than the minor threshold.

4. The system of claim 1, wherein the encapsulated network packet comprises a Mapping of Address and Port with Encapsulation (MAP-E) packet.

5. The system of claim 1, wherein the message includes data specifying the IPv6 header information of an outer header of a respective encapsulated packet, the IPv4 header information of an inner header of the respective encapsulated packet, and a delimiter between the IPv6 header information and the IPv4 header information.

6. The system of claim 1, wherein the message includes data specifying:
the IPv6 header information of an outer header of a respective encapsulated packet; and
a member value indicating that the IPv6 header information is followed by one or more type-length-value (TLV) data structures, the one or more TLV data structures including the data representing the IPv4 header information.

7. The system of claim 6, wherein the data representing the IPv4 header information includes one or more of a protocol, a source IPv4 address, a source port, a destination IPv4 address, or a destination port.

8. The system of claim 1, wherein the message includes data specifying:
the IPv6 header information of an outer header of a respective encapsulated packet;
at least some of the IPv4 header information of an inner header of the respective encapsulated packet;
a delimiter between the IPv6 header information and the IPv4 header information;
a member value indicating that the IPv6 header information or the at least some of the IPv4 header information is followed by one or more type-length-value (TLV) data structures; and
the one or more TLV data structures including the data representing at least some more of the IPv4 header information.

9. A system acting as an entry point to a network tunnel of an IPv6 network, the system comprising one or more processors implemented in circuitry and configured to:
receive a message from a network device that acts as termination point of the network tunnel, the message including data representing IPv6 header information and IPv4 header information and indicating that the IPv6 header information was spoofed;
receive an encapsulated network packet;
determine that the encapsulated network packet is a spoofed network packet, wherein to determine that the encapsulated network packet is the spoofed network packet, the one or more processors are configured to:
match the IPv6 header information to outer header information of the encapsulated packet; and
match the IPv4 header information to inner header information of the encapsulated packet; and
in response to detecting the spoofed network packet, drop the encapsulated network packet.

10. The system of claim 9, wherein the encapsulated network packet comprises a Mapping of Address and Port with Encapsulation (MAP-E) packet and the network device comprises Border Relay (BR) device.

11. The system of claim 9, wherein the message includes data specifying the IPv6 header information of an outer header of a respective encapsulated packet, the IPv4 header information of an inner header of the respective encapsulated packet, and a delimiter between the IPv6 header information and the IPv4 header information.

12. The system of claim 9, wherein the message includes data specifying:
the IPv6 header information of an outer header of a respective encapsulated packet; and
a member value indicating that the IPv6 header information is followed by one or more type-length-value (TLV) data structures, the one or more TLV data structures including the data representing the IPv4 header information.

13. The system of claim 12, wherein the data representing the IPv4 header information includes one or more of a protocol, a source IPv4 address, a source port, a destination IPv4 address, or a destination port.

14. The system of claim 12, wherein the one or more processors are further configured to:
extract the outer header information from the encapsulated packet; and
extract the inner header information from the encapsulated packet using the member value and the one or more TLV data structures.

15. The system of claim 9, wherein the message includes data specifying:
the IPv6 header information of an outer header of a respective encapsulated packet;

at least some of the IPv4 header information of an inner header of the respective encapsulated packet;

a delimiter between the IPv6 header information and the IPv4 header information;

a member value indicating that the IPv6 header information or the at least some of the IPv4 header information is followed by one or more type-length-value (TLV) data structures; and the one or more TLV data structures including the data representing at least some more of the IPv4 header information.

16. The system of claim 15, wherein the one or more processors are further configured to:

extract the outer header information from the encapsulated packet;

extract at least some of the inner header information from the encapsulated packet without using the member value and the one or more TLV data structures; and extract at least some more of the inner header information from the encapsulated packet using the member value and the one or more TLV data structures.

\* \* \* \* \*